B. FELDMAN.
DENTAL FORCEPS.
APPLICATION FILED MAR. 28, 1913.
1,083,527.
Patented Jan. 6, 1914.
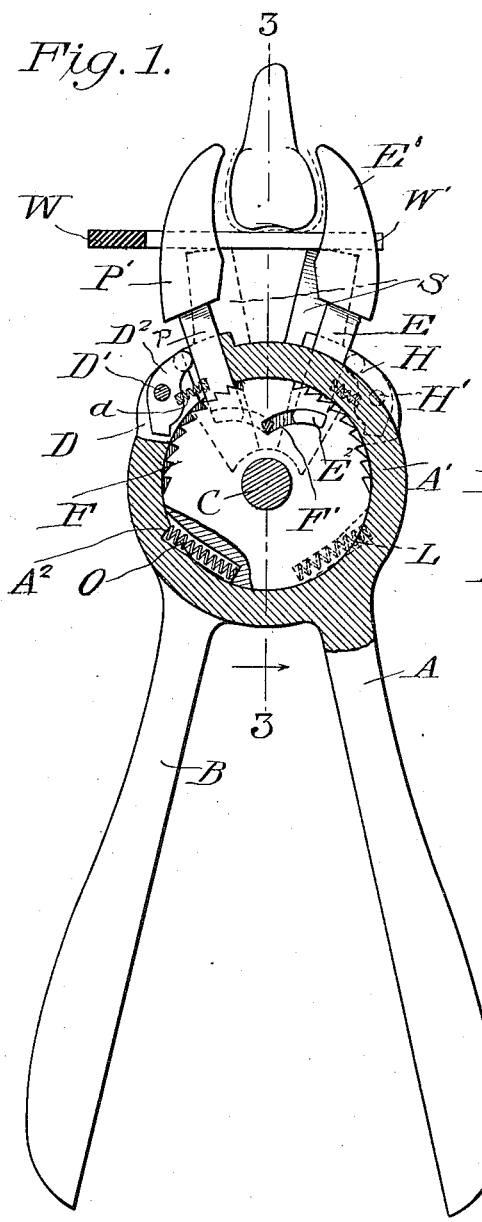
Fig. 1.
Fig. 2.
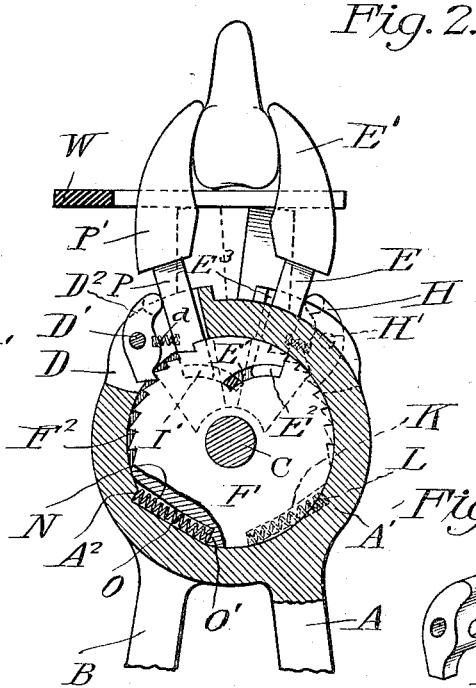
Fig. 5.
Fig. 3.
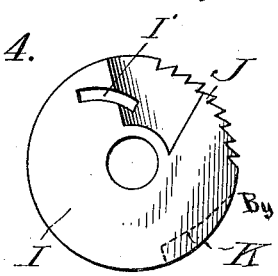
Fig. 4.
WITNESSES
Fenton S. Belt
J. H. Sherwood
INVENTOR
Bernard Feldman,
By
Attorney
COLUMBIA PLANOGRAPH CO., WASHINGTON, D. C.

UNITED STATES PATENT OFFICE.

BERNARD FELDMAN, OF PERTH AMBOY, NEW JERSEY.

DENTAL FORCEPS.

1,083,527.  Specification of Letters Patent.  Patented Jan. 6, 1914.

Application filed March 28, 1913. Serial No. 757,459.

*To all whom it may concern:*

Be it known that I, BERNARD FELDMAN, a citizen of the United States, residing at Perth Amboy, in the county of Middlesex and State of New Jersey, have invented certain new and useful Improvements in Dental Forceps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in forceps and comprises a simple and efficient device of this nature so arranged that, when the handles actuating the jaws, which are interchangeable, are brought together, the tooth may be gripped and, upon further gripping action of the jaws drawing the same toward each other, to cause the tooth to be loosened from its socket in the jaw.

The invention consists further in the provision of means whereby double pulling actions are exerted upon the tooth as the jaws are gripped and brought together.

The invention comprises various details of construction and combinations and arrangements of parts which will be hereinafter fully described, shown in the accompanying drawings and then specifically defined in the appended claims.

I illustrate my invention in the accompanying drawings, in which:—Figure 1 is a sectional view through forceps made in accordance with my invention. Fig. 2 is a similar sectional view showing the jaws in gripping relation with the tooth. Fig. 3 is a section on line 3—3 looking in the direction of the arrow. Fig. 4 is a detail section of one of the jaw-actuating members, and Fig. 5 is a detail perspective view of a pawl.

Reference now being had to the details of the drawings by letter, A and B designate two handles, the former of which is provided with a recessed head $A'$ and the latter with a similar recessed head $B'$. A pivotal pin C passes through registering apertures in the walls of said recesses and by means of which the two heads are pivoted together. The head $A'$ is recessed at D and a pivotal pin $D'$ is mounted in the walls of the recess and upon which pin a pawl $D^2$ is provided and a spring $d$ is interposed between said pawl and the shank portion P of a jaw $P'$, which spring tends normally to hold the jaw in the position shown in Fig. 1, in which the edge of the shank portion thereof is in contact with the end of the slot D, there being one fastened also in a slot in the head $B'$ and bearing against the shank E of the jaw $E'$, the springs tending to yield as the jaws come in contact with the tooth, as shown in Fig. 2 of the drawings. Each jaw is similarly mounted, the shank portion E of the jaw $E'$ being mounted in a slot $E^3$ and a pawl H mounted upon a pivotal pin $H'$ bears against the outer edge of the shank $E'$.

Referring to Fig. 3 of the drawings, it will be noted that at the end of the shank E is a laterally extending lug $E^2$, and F and I designate two disks loosely mounted upon the pin C, the former of which disks is provided with ratchet teeth $F^2$ in the circumference thereof, while the disk I is provided with similar teeth J, said ratchet teeth being adapted to be engaged by the pawls in the manner shown. The disk F is provided with an elongated curved slot $F'$ in which the lug $E^2$ is positioned and affording means whereby, as the disk is rotated, a longitudinal movement may be imparted to the jaw $E'$. A similar lug projects from the end of the shank P of the jaw $P'$ and engages an elongated curved slot $I'$ in the disk I. A coiled spring, designated by letter O, is mounted with one end bearing against a shoulder $A^2$, formed in the wall of the chamber or recess of the head $A'$, while its opposite end engages a shoulder $O'$ formed in the circumference of the disk F. A similar coiled spring L bears against a shoulder formed in the wall of the recessed head $B'$ and its other end bears against a shoulder on the disk I, said recess in the disk I being designated in dotted lines by letter K in the drawings.

Upon the outer faces of the heads $A'$ and $B'$ are guideways, designated by letter $S'$, between which a removable bracket member S is mounted to have a longitudinal play, it being held in an adjusted position by means of set screws T. Said bracket members are adapted to support the forked plate W which has two parallel arms $W'$ and $W^2$, designed to be interposed between the ends of the bracket members and the teeth, one upon either side of an intermediate tooth to be gripped by the jaws, as shown in Fig. 3 of the drawings.

In order to provide against the contingency of there being too great stress upon the beaks when gripping and loosening the tooth from its socket incident to the action of the projecting lugs upon the shafts of the beaks engaging frictionally the edges of the cam slots, thus causing the beaks to be moved longitudinally as the handles are pressed together, I propose to make the beaks or jaws somewhat resilient which would better adapt the beak to the tooth and which, while forming a firm grip, would be sufficient to impart the initial movement to the tooth from its socket without the liability of crushing the same.

In operation, when it is desired to grip and draw a tooth, the forked member W is placed upon the ends of the bracket members S intermediate the same and the teeth, one upon either side of the one to be gripped by the jaws. The jaws, before gripping the tooth, are normally held in the position shown in Fig. 1 of the drawings, the adjacent edges of the shanks of the jaws being held against the adjacent ends of the slots in which said shanks are positioned by means of the coiled springs O and L which bear respectively against the ends of the recesses formed in the disks, causing the disks to make partial revolutions under the tension of the springs and which in turn will hold the shanks in the positions shown in Fig. 1 by reason of the ends of the curved slots in the disks bearing against the edges of the lateral extensions upon said shanks. When the handles are moved toward each other and the jaws come in contact with the tooth, the movement of the jaws is arrested slightly, while the heads carrying the same move farther with the handles. This movement will cause the shank portions of the jaws to tilt the pawls in order to engage the teeth of the disk and a further compression of the handles will cause the disk to move with the handle carrying the jaws and the curved edges of the cam slots coming in contact with the edges of the lateral extensions of the shanks of the jaws will cause a longitudinal or pulling movement to be imparted to the latter and the tooth gripped by the jaws. An auxiliary pulling movement will also be imparted to the tooth through the medium of the bracket members S.

It will be noted upon reference to Fig. 1 of the drawings that the outer ends of the shoulders are slightly inclined and that, when the jaws are brought together by the gripping action upon the handles, a wedging action will effect intermediate side bracket members and the forked member W, which will cause the handles of the forceps to be moved bodily away from the tooth a slight distance.

If it should be desired to increase the movement to be imparted to the two handles by reason of the wedging action referred to, members W of different thicknesses may be employed to be interposed between the bracket members and the teeth, one upon either side of the one to be withdrawn.

By the provision of forceps made in accordance with my invention, it will be noted that the tooth is first gripped securely by the jaw, afterward loosened from its socket in the jaw as the handles are gripped and compressed, thus withdrawing the tooth without the necessity of a pulling action upon the handles of the forceps.

It will be understood that, as the beaks are interchangeable, various kinds of beaks or jaws may be substituted for the forms shown in the drawings, thus adapting the instrument for dental, mechanical or other purposes for which any two-handled instruments of this nature may be utilized.

What I claim to be new is:—

1. Forceps comprising two handles which are provided with chambered heads pivoted together, the wall of each chambered portion being slotted, movable jaws having shank portions extending through said slots, disks mounted upon a pivotal pin connecting the heads and having ratchet teeth in their circumference, spring-pressed pawls pivoted one upon each head and adapted to engage said teeth, each disk having a cam slot, laterally extending lug upon each jaw engaging said slot, said pawls being thrown into engagement with the teeth as the tooth is gripped by the jaws, thereby causing the disk to move with the head and cause a longitudinal movement to be applied to said jaw, as set forth.

2. Forceps comprising two handles which are provided with chambered heads, a pivotal pin passing through apertures in said heads, the wall of each chambered portion being slotted, toothed disks loosely mounted upon said pin within the chambered heads, springs bearing intermediate the shoulders formed upon the walls of the heads and said disks, each disk having a cam slot, jaws having shank portions passing through said slots and each having a laterally extending lug movable within said slots, a pivotal pawl mounted in each slot, a spring bearing against the pawl and the shank portion of a jaw, said pawls being adapted to be thrown into engagement with said teeth as the jaws are forced against the tooth thereby affording means whereby the disks will move with the heads in which they are mounted and effect a pulling movement upon the jaws, as set forth.

3. Forceps comprising two handles which are provided with chambered heads, a pivotal pin passing through apertures in said heads, the wall of each chambered portion being slotted, toothed disks mounted upon said pin within the chambered heads, springs bearing intermediate the shoulders formed upon the walls of the heads and said disks, each disk having a cam slot, jaws having shank portions passing through said slots and each having a laterally extending lug movable within said slots, a pivotal pawl mounted in each slot, a spring bearing against the pawl and the shank portion of a jaw, said pawls being adapted to be thrown into engagement with said teeth as the jaws are forced against the tooth thereby affording means whereby the disks will move with the heads in which they are mounted and effect a pulling movement upon the jaws, and auxiliary means for imparting a pulling movement upon the forceps as the handles are brought together, as set forth.

4. Forceps comprising two handles which are provided with chambered heads, a pivotal pin passing through apertures in said heads, the wall of each chambered portion being slotted, toothed disks mounted upon said pin within the chambered heads, springs bearing intermediate the shoulders formed upon the walls of the heads and said disks, each disk having a cam slot, jaws having shank portions passing through said slots and each having a laterally extending lug movable within said slots, a pivotal pawl mounted in each slot, a spring bearing against the pawl and the shank portion of a jaw, said pawls being adapted to be thrown into engagement with said teeth as the jaws are forced against the tooth thereby affording means whereby the disks will move with the heads in which they are mounted and effect a pulling movement upon the jaws, bracket arms projecting one from each of said heads, a forked member adapted to be engaged by said bracket arms and designed to fulcrum against the teeth upon either side of the one to be gripped by said jaws, as set forth.

5. Forceps comprising two handles which are provided with chambered heads, a pivotal pin passing through apertures in said heads, the wall of each chambered portion being slotted, toothed disks mounted upon said pin within the chambered heads, springs bearing intermediate the shoulders formed upon the walls of the heads and said disks, each disk having a cam slot, jaws having shank portions passing through said slots and each having a laterally extending lug movable within said slots, a pivotal pawl mounted in each slot, a spring bearing against the pawl and the shank portion of a jaw, said pawls being adapted to be thrown into engagement with said teeth as the jaws are forced against the tooth thereby affording means whereby the disks will move with the heads in which they are mounted and effect a pulling movement upon the jaws, adjustable bracket arms projecting one from each of said heads, a forked member adapted to be engaged by said bracket arms and designed to fulcrum against the teeth upon either side of the one to be gripped by said jaws, as set forth.

6. Forceps comprising two handles which are provided with chambered heads, a pivotal pin passing through apertures in the walls of the latter, the circumferential wall of each chamber being slotted, toothed disks loosely mounted upon said pin within the chambered heads, springs bearing intermediate the walls of the chambered portions of the heads and said disks, each disk having a cam slot, interchangeable jaws having resilient shanks to insure a firm grip upon the tooth without fracturing the same under pressure, each shank having a laterally extending portion movable within a cam slot, a pawl pivoted in each slot, a spring bearing intermediate the shank of the jaw and pawl, said pawls being adapted to be thrown into engagement with the teeth as the jaws are forced against the tooth, thereby affording means whereby the disk will move with the heads in which they are mounted to effect a pulling movement upon the jaws, bracket members projecting from each of said heads, a forked member adapted to fulcrum against teeth upon either side of the one to be gripped by said jaws and against which forked member bracket arms contact, as set forth.

In testimony whereof I hereunto affix my signature in presence of two witnesses.

BERNARD FELDMAN.

Witnesses:
JOHN A. DELANEY,
LOUIS G. LOSNE.

Copies of this patent may be obtained for five cents each, by addressing the "Commissioner of Patents, Washington, D. C."